United States Patent
Tsai

(10) Patent No.: US 11,750,123 B1
(45) Date of Patent: Sep. 5, 2023

(54) CONTROL CIRCUIT OF BRUSHLESS DIRECT CURRENT MOTOR AND METHOD FOR DETECTING INITIAL ROTOR POSITION OF BRUSHLESS DIRECT CURRENT MOTOR

(71) Applicant: Elite Semiconductor Microelectronics Technology Inc., Hsinchu (TW)

(72) Inventor: Ming-Fu Tsai, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 0 days.

(21) Appl. No.: 17/841,699

(22) Filed: Jun. 16, 2022

(51) Int. Cl.
  *H02P 6/06* (2006.01)
  *H02P 6/182* (2016.01)
  *H02P 6/20* (2016.01)

(52) U.S. Cl.
  CPC .............. *H02P 6/182* (2013.01); *H02P 6/20* (2013.01); *H02P 2203/03* (2013.01)

(58) Field of Classification Search
  CPC .... H02P 6/06; H02P 21/18; H02P 6/20; H02P 6/182; H02P 2203/03
  See application file for complete search history.

(56) References Cited

U.S. PATENT DOCUMENTS

| 7,334,854 B1* | 2/2008 | Chang | H02P 6/20 318/722 |
| 2018/0241333 A1* | 8/2018 | Sakai | H02P 21/18 |
| 2020/0235683 A1* | 7/2020 | Suzuki | H02P 6/06 |

* cited by examiner

*Primary Examiner* — Cortez M Cook
(74) *Attorney, Agent, or Firm* — Winston Hsu

(57) ABSTRACT

A control circuit arranged to detect an initial rotor position of a brushless DC motor includes: a voltage integrator circuit, arranged to perform integration upon an input voltage, to generate a plurality of integrated voltages; a PWM generating circuit, arranged to generate and output a plurality of PWM signals to the brushless DC motor through a drive circuit, and stop outputting a PWM signal that is any of the plurality of PWM signals to the brushless DC motor according to an integrated voltage corresponding to the PWM signal; a current receiving circuit, arranged to receive a plurality of feedback currents from the brushless DC motor; a comparison circuit, arranged to perform comparison upon the plurality of feedback currents, to generate a comparison result; and a decision circuit, arranged to detect the initial rotor position according to the comparison result.

16 Claims, 2 Drawing Sheets

CONTROL CIRCUIT OF BRUSHLESS DIRECT CURRENT MOTOR AND METHOD FOR DETECTING INITIAL ROTOR POSITION OF BRUSHLESS DIRECT CURRENT MOTOR

BACKGROUND OF THE INVENTION

1. Field of the Invention

The present invention is related to a brushless direct current (DC) motor, and more particularly, to a control circuit of a brushless DC motor that is arranged to detect an initial rotor position of the brushless DC motor and associated method.

2. Description of the Prior Art

For a brushless DC motor, in order to save costs and improve robustness, a position sensor (e.g. a hall sensor) is usually not installed on the brushless DC motor. It is necessary to drive the brushless DC motor with a typical sensorless driving method, and an initial rotor position of the brushless DC motor plays an important role in the typical sensorless driving method.

For a conventional motor control circuit, a series of pulse width modulation (PWM) signals will be output to the brushless DC motor through a drive circuit, to control an angle of a driving voltage that is output from the drive circuit to the brushless DC motor to be one of a plurality of detection angles, respectively, to generate a plurality of feedback currents corresponding the plurality of detection angles, respectively, wherein the output time of the PWM signals or the value of the feedback currents is fixed to obtain a voltage angle corresponding to a feedback current with the maximum value or a voltage angle corresponding to the shortest output time of a PWM signal, and the initial rotor position of the brushless DC motor may be detected according to the voltage angle. If an input voltage output to the motor control circuit and the drive circuit is unstable, however, the driving voltage will also be unstable, which will affect the value of feedback currents, resulting in inaccurate feedback current measurement and inaccurate detection of the initial rotor position of the brushless DC motor. As a result, a novel method and associated control circuit that can accurately detect the initial rotor position of the brushless DC motor under a condition that the input voltage is unstable are urgently needed.

SUMMARY OF THE INVENTION

It is therefore one of the objectives of the present invention to provide a control circuit of a brushless DC motor that is arranged to detect an initial rotor position of the brushless DC motor and associated method, to address the above-mentioned problems.

According to an embodiment of the present invention, a control circuit of a brushless DC motor that is arranged to detect an initial rotor position of the brushless DC motor is provided. The control circuit may include a voltage integrator circuit, a pulse width modulation (PWM) generating circuit, a current receiving circuit, a comparison circuit, and a decision circuit. The voltage integrator circuit may be arranged to receive an input voltage, and perform integration upon the input voltage, to generate a plurality of integrated voltages corresponding to a plurality of PWM signals, respectively. The PWM generating circuit may be coupled to the voltage integrator circuit, and may be arranged to generate the plurality of PWM signals, output the plurality of PWM signals to the brushless DC motor through a drive circuit, and stop outputting a PWM signal to the brushless DC motor according to an integrated voltage corresponding to the PWM signal, wherein a driving voltage is generated by the drive circuit for driving the brushless DV motor, and the PWM signal is any of the plurality of PWM signals, and is arranged to control an angle of the driving voltage to be one of a plurality of detection angles. The current receiving circuit may be coupled to the voltage integrator circuit, and may be arranged to receive a plurality of feedback currents from the brushless DC motor, wherein the plurality of feedback currents correspond to the plurality of PWM signals, respectively. The comparison circuit may be coupled to the current receiving circuit, and may be arranged to perform comparison upon the plurality of feedback currents, to generate a comparison result. The decision circuit may be coupled to the comparison circuit, and may be arranged to detect the initial rotor position of the brushless DC motor according to the comparison result.

According to an embodiment of the present invention, a method for detecting an initial rotor position of a brushless DC motor is provided. The method may include: receiving an input voltage; performing integration upon the input voltage, to generate a plurality of integrated voltages corresponding to a plurality of pulse width modulation (PWM) signals, respectively; generating the plurality of PWM signals, and outputting each of the plurality of PWM signals to the brushless DC motor, respectively; stopping outputting a PWM signal to the brushless DC motor according to an integrated voltage corresponding to the PWM signal, wherein a driving voltage is generated for driving the brushless DC motor, and the PWM signal is any of the plurality of PWM signals, and is arranged to control an angle of the driving voltage to be one of a plurality of detection angles; receiving a plurality of feedback currents from the brushless DC motor, wherein the plurality of feedback currents correspond to the plurality of PWM signals, respectively; performing comparison upon the plurality of feedback currents, to generate a comparison result; and detecting the initial rotor position of the brushless DC motor according to the comparison result.

One of the benefits of the present invention is that, by the control circuit of the present invention, the PWM signals are stopped to be output to the brushless DC motor according to whether respective integrated voltage is not smaller than the predetermined value, respectively, and the feedback currents are also received by the current receiving circuit according to whether the respective integrated voltage is not smaller than the predetermined value, respectively, wherein the respective integrated voltage will not be affected by input voltage instability. In this way, the inaccurate feedback current measurement and the inaccurate detection of the initial rotor position of the brushless DC motor caused by the unstable input voltage may be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
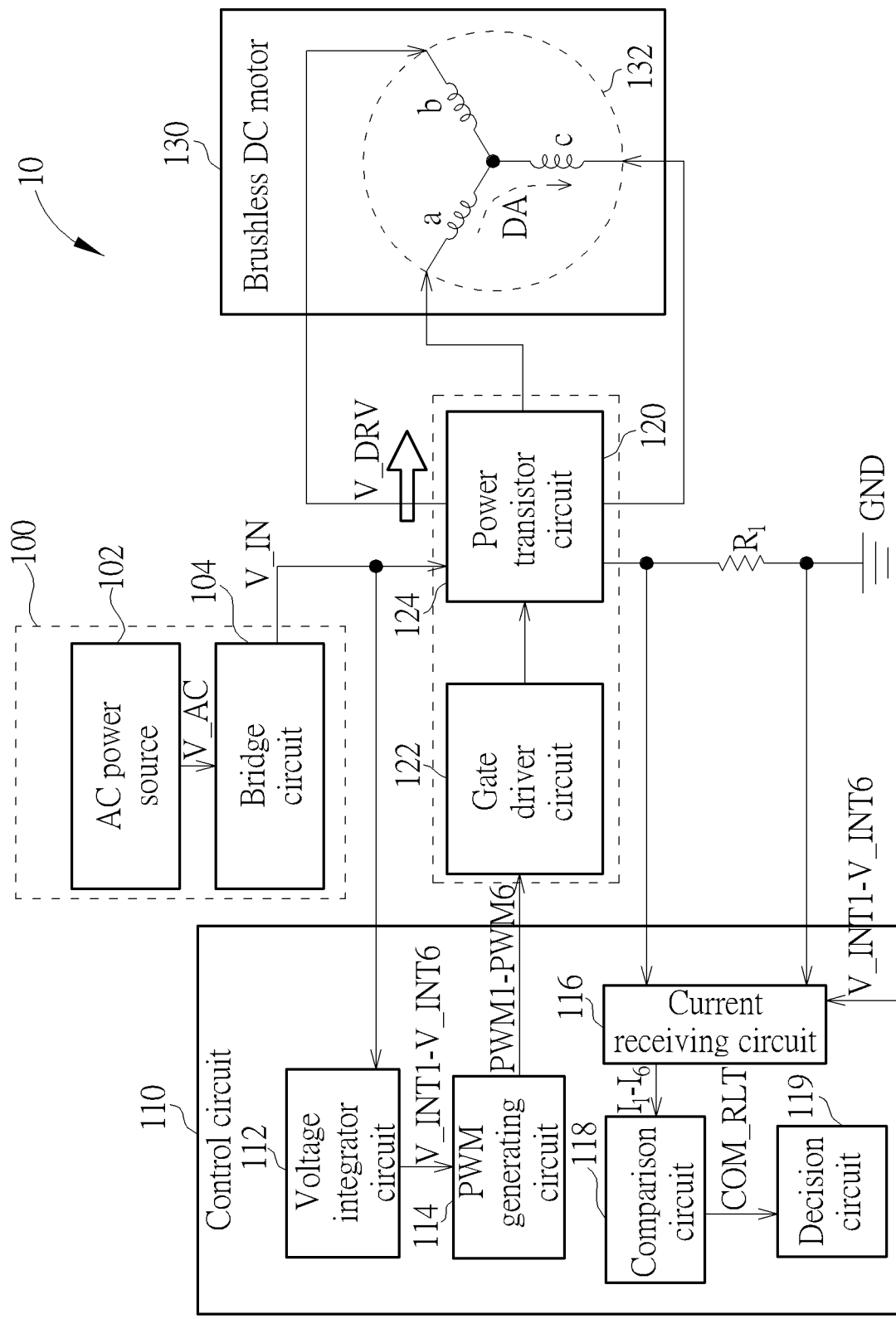
FIG. 1 is a diagram illustrating a brushless DC motor driving system according to an embodiment of the present invention.

FIG. 1 is a diagram illustrating a brushless direct current (DC) motor driving system 10 according to an embodiment of the present invention. As shown in FIG. 1, the brushless DC motor driving system 10 may include an input voltage generating circuit 100, a control circuit 110, a drive circuit 120, and a brushless DC motor 130, wherein the brushless DC motor 130 may include a rotor (not shown) and a stator 132, the rotor may be a permanent magnet, the stator 132 may be a three phase stator winding, and the control circuit 110 may be arranged to detect an initial rotor position of the brushless DC motor 130. The stator 132 may have a Y-connection structure or a delta-connection structure, and may include a stator winding a, a stator winding b, a stator winding c. In this embodiment, the stator 132 has the Y-connection structure, but the present invention is not limited thereto.

The input voltage generating circuit 100 may include an alternating current (AC) power source 102 and a bridge circuit 104. The bridge circuit 104 may be arranged to receive an AC voltage V_AC from the AV power source 102, and process the AC voltage V_AC to generate an input voltage V_IN, wherein the input voltage V_IN may be transmitted to the control circuit 110 and the drive circuit 120. Alternatively, the input voltage generating circuit 100 may be implemented by a battery, and the input voltage V_IN may be provided by the battery.

The drive circuit 120 may include a gate driver circuit 122 and a power transistor circuit 124, and may be arranged to generate a driving voltage V_DRV for driving the brushless DC motor 130, wherein the voltage value of the driving voltage V_DRV is fixed. The gate driver circuit 122 may be coupled to the control circuit 110. The power transistor circuit 124 may be coupled to the bridge circuit 104, the gate driver circuit 122 and the stator 132 (more particularly, the stator winding a, the stator winding b, and the stator winding c) of the brushless DC motor 130, and may be arranged to receive the input voltage V_IN. The control circuit 110 may include a voltage integrator circuit 112, a pulse width modulation (PWM) generating circuit 114, a current receiving circuit 116, a comparison circuit 118, and a decision circuit 119.

The voltage integrator circuit 112 may be arranged to receive the input voltage V_IN, and perform integration upon the input voltage V_IN, to generate a plurality of integrated voltages V_INT1-V_INT6 corresponding to a series of PWM signals PWM1-PWM6, respectively. That is, the voltage integrator circuit 112 performs integration upon the input voltage V_IN to generate the integrated voltage V_INT1 during a period in which the PWM generating circuit 114 provides the PWM signal PWM1 to the gate driver circuit 122, performs integration upon the input voltage V_IN to generate the integrated voltage V_INT2 during a period in which the PWM generating circuit 114 provides the PWM signal PWM2 to the gate driver circuit 122, performs integration upon the input voltage V_IN to generate the integrated voltage V_INT3 during a period in which the PWM generating circuit 114 provides the PWM signal PWM3 to the gate driver circuit 122, performs integration upon the input voltage V_IN to generate the integrated voltage V_INT4 during a period in which the PWM generating circuit 114 provides the PWM signal PWM4 to the gate driver circuit 122, performs integration upon the input voltage V_IN to generate the integrated voltage V_INT5 during a period in which the PWM generating circuit 114 provides the PWM signal PWM5 to the gate driver circuit 122, and performs integration upon the input voltage V_IN to generate the integrated voltage V_INT6 during a period in which the PWM generating circuit 114 provides the PWM signal PWM6 to the gate driver circuit 122.

The PWM generating circuit 114 may be coupled to the voltage integrator circuit 112, and may be arranged to generate the PWM signals PWM1-PWM6, and output the PWM signals PWM1-PWM6 to the brushless DC motor 130 through the drive circuit 120, wherein each of the PWM signals PWM1-PWM6 may be arranged to control an angle of the driving voltage V_DRV to be one of a plurality of detection angles, so that the commutation may be performed upon the stator 132 (more particularly, the stator winding a, the stator winding b, and the stator winding c) of the brushless DC motor 130.

In this embodiment, the detection angles may be 0 degrees, 60 degrees, 120 degrees, 180 degrees, 240 degrees, and 300 degrees. When the PWM signal PWM1 is output to the brushless DC motor 130 through the drive circuit 120, the angle of the driving voltage V_DRV may be controlled to be 0 degrees, and for the stator 132 of the brushless DC motor 130, the current flows from the stator winding a to the stator winding b; when the PWM signal PWM2 is output to the brushless DC motor 130 through the drive circuit 120, the angle of the driving voltage V_DRV may be controlled to be 60 degrees, and for the stator 132 of the brushless DC motor 130, the current flows from the stator winding a to the stator winding c (e.g. the current direction for 60 degrees is labeled as a dashed arrow DA in FIG. 1); when the PWM signal PWM3 is output to the brushless DC motor 130 through the drive circuit 120, the angle of the driving voltage V_DRV may be controlled to be 120 degrees, and for the stator 132 of the brushless DC motor 130, the current flows from the stator winding b to the stator winding c; when the PWM signal PWM4 is output to the brushless DC motor 130 through the drive circuit 120, the angle of the driving voltage V_DRV may be controlled to be 180 degrees, and for the stator 132 of the brushless DC motor 130, the current flows from the stator winding b to the stator winding a; when the PWM signal PWM5 is output to the brushless DC motor 130 through the drive circuit 120, the angle of the driving voltage V_DRV may be controlled to be 240 degrees, and for the stator 132 of the brushless DC motor 130, the current flows from the stator winding c to the stator winding a; and when the PWM signal PWM6 is output to the brushless DC motor 130 through the drive circuit 120, the angle of the driving voltage V_DRV may be controlled to be 300 degrees, and for the stator 132 of the brushless DC motor 130, the current flows from the stator winding c to the stator winding b.

The PWM generating circuit 114 may be further arranged to stop outputting a PWM signal to the brushless DC motor 130 according to an integrated voltage corresponding to the PWM signal, wherein the PWM signal may be any of the PWM signals PWM1-PWM6. Specifically, in response to the integrated voltage being not smaller than a predetermined value TH (i.e. the integrated voltage TH), the PWM generating circuit 114 stops outputting the PWM signal to the brushless DC motor 130. After the PWM signal is stopped to be output to the brushless DC motor 130, the voltage integrator circuit 110 may set the integrated voltage as an initial value (e.g. 0). The brushless DC motor driving system 10 may further include a shunt resistor $R_1$, wherein one terminal of the shunt resistor $R_1$ may be coupled to the power transistor circuit 124, and another terminal of the shunt resistor $R_1$ may be coupled to a reference voltage (e.g. a ground voltage GND).

The current receiving circuit 116 may be coupled to two terminals of the shunt resistor $R_1$ and the PWM generating circuit 114, and may be arranged to receive a plurality of feedback currents $I_1$-$I_6$ from the brushless DC motor 130 through the shunt resistor $R_1$, wherein the feedback currents $I_1$-$I_6$ correspond to the PWM signals PWM1-PWM6, respectively. It should be noted that, a feedback current is received by the current receiving circuit 116 from the brushless DC motor 130 in response to an integrated voltage (which corresponds to the feedback current) being not smaller than the predetermined value TH (i.e. the integrated voltage ≥TH), wherein the feedback current is any of the feedback currents $I_1$-$I_6$.

For example, under a condition that the PWM signal PWM1 is output to the brushless DC motor 130 through the drive circuit 120, in response to the integrated voltage V_INT1 being not smaller than the predetermined value TH (i.e. V_INT1≥TH), the PWM generating circuit 114 stops outputting the PWM signal PWM1 to the brushless DC motor 130, and the current receiving circuit 116 receives the feedback current $I_1$ from the brushless DC motor 130. After the PWM signal PWM1 is stopped to be output to the brushless DC motor 130, the voltage integrator circuit 110 sets the integrated voltage V_INT1 as 0, and perform integration upon the input voltage V_IN, to generate the integrated voltage V_INT2 corresponding to the PWM signal PWM2. Under a condition that the PWM signal PWM2 is output to the brushless DC motor 130 through the drive circuit 120, in response to the integrated voltage V_INT2 being not smaller than the predetermined value TH (i.e. V_INT2≥TH), the PWM generating circuit 114 stops outputting the PWM signal PWM2 to the brushless DC motor 130, and the current receiving circuit 116 receives the feedback current $I_2$ from the brushless DC motor 130. After the PWM signal PWM2 is stopped to be output to the brushless DC motor 130, the voltage integrator circuit 110 sets the integrated voltage V_INT2 as 0, and perform integration upon the input voltage V_IN, to generate the integrated voltage V_INT3 corresponding to the PWM signal PWM3. For brevity, similar descriptions for operations of the PWM signals PWM3-PWM6 are omitted here.

The comparison circuit 118 may be coupled to the current receiving circuit 116, and may be arranged to perform comparison upon the feedback currents $I_1$-$I_6$, to generate a comparison result COM_RLT, wherein the comparison result COM_RLT is indicative of a maximum feedback current in the feedback currents $I_1$-$I_6$. The decision circuit 119 may be coupled to the comparison circuit 118, and may be arranged to detect the initial rotor position of the brushless DC motor 130 according to the comparison result COM_RLT. That is, the initial rotor position of the brushless DC motor 130 is detected according to an angle corresponding to the maximum feedback current of the driving voltage V_DRV.

As mentioned in the prior art, if the input voltage V_IN output to the control circuit 110 and the drive circuit 120 is unstable, the driving voltage V_DRV will also be unstable, which will affect the current value of the feedback currents $I_1$-$I_6$, resulting in inaccurate feedback current measurement and inaccurate detection of the initial rotor position of the brushless DC motor 130. In this embodiment, the bridge circuit 104 processes the AC voltage V_AC to generate the input voltage V_IN, and the input voltage V_IN may be an unstable ripple voltage signal. In some embodiments, the input voltage V_IN may be provided by a battery, and after long-term use of the battery, the voltage provided by the battery may be unstable. To solve this issue, the PWM signals PWM1-PWM6 are stopped to be output to the brushless DC motor 130 according to whether respective integrated voltage is not smaller than the predetermined value TH, respectively, and the feedback currents $I_1$-$I_6$ are also received by the current receiving circuit 116 according to whether the respective integrated voltage is not smaller than the predetermined value TH, respectively, wherein the respective integrated voltage will not affected by input voltage instability. In this way, the inaccurate feedback current measurement and the inaccurate detection of the initial rotor position of the brushless DC motor 130 caused by the unstable input voltage may be improved.

Figure 2:
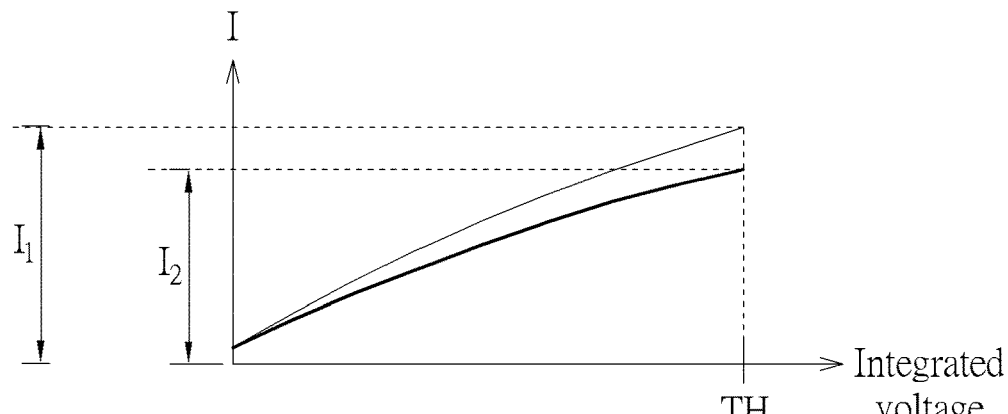
FIG. 2 is a diagram illustrating relationship between the feedback current and the integrated voltage according to an embodiment of the present invention.

FIG. 2 is a diagram illustrating relationship between the feedback current and the integrated voltage according to an embodiment of the present invention. For better comprehension, it is assumed that the PWM generating circuit 114 only outputs the PWM signals PWM1 and PWM2 to the brushless DC motor 130 according to the integrated voltages V_INT1 and V_INT2, respectively. In response to the integrated voltage V_INT1 being not smaller than the predetermined value TH (i.e. V_INT1≥TH), the current receiving circuit 116 receives the feedback current $I_1$ from the brushless DC motor 130. Similarly, in response to the integrated voltage V_INT2 being not smaller than the predetermined value TH (i.e. V_INT2≥TH), the current receiving circuit 116 receives the feedback current $I_2$ from the brushless DC motor 130. As shown in FIG. 2, a current value of the feedback current $I_1$ is larger than that of the feedback current $I_2$ when both of the integrated voltages V_INT1 and V_2 are equal to the predetermined value TH. As a result, the comparison result COM_RLT is indicative of the feedback current $I_1$ being the maximum feedback current among the feedback current $I_1$ and the feedback current $I_2$, and the initial rotor position of the brushless DC motor 130 may be detected according to the detection angle corresponding to the feedback current $I_1$ of the driving voltage V_DRV (i.e. 0 degrees).

Figure 3:
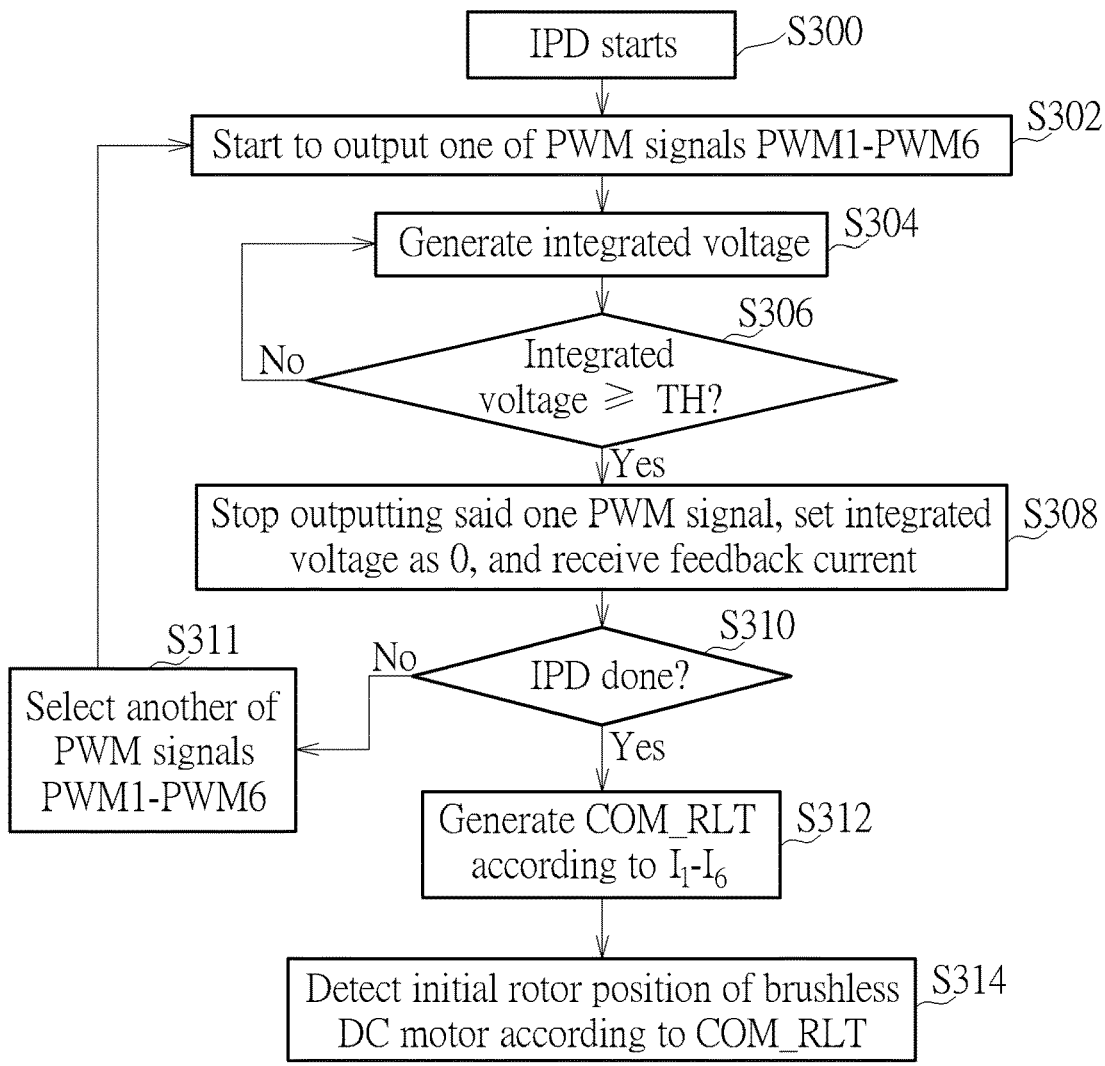
FIG. 3 is a flow chart of a method for detecting an initial rotor position of a brushless DC motor according to an embodiment of the present invention.

FIG. 3 is a flow chart of a method for detecting an initial rotor position of a brushless DC motor according to an embodiment of the present invention. Provided that the result is substantially the same, the steps are not required to be executed in the exact order shown in FIG. 3. For example, the method shown in FIG. 3 may be employed by the control circuit 110 shown in FIG. 1.

In Step S300, the control circuit 110 starts to perform initial position detection (IPD) upon the brushless DC motor 130, to detect an initial rotor position of the brushless DC motor 130 according to one of a plurality of detection angles (e.g. 0 degrees, 60 degrees, 120 degrees, 180 degrees, 240 degrees, and 300 degrees). For example, 0 degrees is determined as an initial detection angle.

In Step S302, one PWM signal of the PWM signals PWM1-PWM6 that is arranged to control an angle of the driving voltage V_DRV to be one of the plurality of detection angles (e.g. the PWM signal PWM1 that is arranged to control an angle of the driving voltage V_DRV to be the initial detection angle (i.e. 0 degrees)) is started to be output to the brushless DC motor 130 through the drive circuit 120 by the PWM generating circuit 114.

In Step S304, an integrated voltage (e.g. the integrated voltage V_INT1) corresponding to said one PWM signal (e.g. the PWM signal PWM1) is generated by the voltage integrator circuit 112.

In Step S306, it is determined that whether the integrated voltage (e.g. the integrated voltage V_INT1) is not smaller than the predetermined value TH (e.g. V_INT1≥TH). If yes, Step S308 is entered; if no, Step S304 is returned, so that the integrated voltage (e.g. the integrated voltage V_INT1) is kept generated by the voltage integrator circuit 112 until the integrated voltage (e.g. the integrated voltage V_INT1) is not smaller than the predetermined value TH (e.g. V_INT1≥TH).

In Step S308, said one PWM signal (e.g. the PWM signal PWM1) is stopped to be output to the brushless DC motor 130, the integrated voltage (e.g. the integrated voltage V_INT1) is set as an initial value (e.g. 0), and a feedback current (e.g. the feedback current $I_1$) corresponding to said one PWM signal (e.g. the PWM signal PWM1) is received by the current receiving circuit 116.

In Step S310, it is determined whether the IPD is done. That is, it is determined that whether all of the feedback currents (e.g. the feedback currents $I_1$-$I_6$) corresponding to the PWM signals PWM signals PWM1-PWM6, respectively, are received by the current receiving circuit 116. If yes, Step S312 is entered; if no, Step S311 is entered.

In Step S311, another of the PWM signals PWM1-PWM6 is selected to control an angle of the driving voltage V_DRV to be another of the detection angles, so that the commutation may be performed upon the stator 132 (more particularly, the stator winding a, the stator winding b, and the stator winding c) of the brushless DC motor 130.

In Step S312, the comparison may be performed upon the feedback currents $I_1$-$I_6$ by the comparison circuit 118, to generate the comparison result COM_RLT that is indicative of a maximum feedback current in the feedback currents $I_1$-$I_6$.

In Step S314, the initial rotor position of the brushless DC motor 130 may be detected according to the comparison result COM_RLT by the decision circuit 119. That is, the initial rotor position of the brushless DC motor 130 may be detected according to an angle corresponding to the maximum feedback current of the driving voltage V_DRV.

Since a person skilled in the pertinent art can readily understand details of the steps after reading above paragraphs directed to the control circuit 110 shown in FIG. 1, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit of a brushless direct current (DC) motor, arranged to detect an initial rotor position of the brushless DC motor, and comprising:
    a voltage integrator circuit, arranged to receive an input voltage, and perform integration upon the input voltage, to generate a plurality of integrated voltages corresponding to a plurality of pulse width modulation (PWM) signals, respectively;
    a PWM generating circuit, coupled to the voltage integrator circuit, and arranged to generate the plurality of PWM signals, output the plurality of PWM signals to the brushless DC motor through a drive circuit, and stop outputting a PWM signal to the brushless DC motor according to an integrated voltage corresponding to the PWM signal, wherein a driving voltage is generated by the drive circuit for driving the brushless DV motor, and the PWM signal is any of the plurality of PWM signals, and is arranged to control an angle of the driving voltage to be one of a plurality of detection angles;
    a current receiving circuit, coupled to the voltage integrator circuit, and arranged to receive a plurality of feedback currents from the brushless DC motor, wherein the plurality of feedback currents correspond to the plurality of PWM signals, respectively;
    a comparison circuit, coupled to the current receiving circuit, and arranged to perform comparison upon the plurality of feedback currents, to generate a comparison result; and
    a decision circuit, coupled to the comparison circuit, and arranged to detect the initial rotor position of the brushless DC motor according to the comparison result;
    wherein in response to the integrated voltage being not smaller than a predetermined value, the PWM generating circuit stops outputting the PWM signal to the brushless DC motor.

2. The control circuit of claim 1, wherein the plurality of detection angles are 0 degrees, 60 degrees, 120 degrees, 180 degrees, 240 degrees, and 300 degrees.

3. The control circuit of claim 1, wherein after the PWM signal is stopped to be output to the brushless DC motor, the voltage integrator circuit sets the integrated voltage as an initial value.

4. The control circuit of claim 1, wherein in response to the integrated voltage being not smaller than a predetermined value, the current receiving circuit receives a feedback current corresponding to the PWM signal from the brushless DC motor.

5. The control circuit of claim 1, wherein the comparison result is indicative of a maximum feedback current in the plurality of feedback currents.

6. The control circuit of claim 5, wherein the initial rotor position of the brushless DC motor is detected according to an angle corresponding to the maximum feedback current of the driving voltage.

7. The control circuit of claim 1, wherein a bridge circuit is arranged to process an alternating current (AC) voltage signal, to generate the input voltage.

8. The control circuit of claim 1, wherein the input voltage is provided by a battery.

9. A method for detecting an initial rotor position of a brushless direct current (DC) motor, comprising:
    receiving an input voltage;
    performing integration upon the input voltage, to generate a plurality of integrated voltages corresponding to a plurality of pulse width modulation (PWM) signals, respectively;
    generating the plurality of PWM signals, and outputting each of the plurality of PWM signals to the brushless DC motor, respectively;
    stopping outputting a PWM signal to the brushless DC motor according to an integrated voltage corresponding to the PWM signal, wherein a driving voltage is generated for driving the brushless DC motor, and the PWM signal is any of the plurality of PWM signals, and is arranged to control an angle of the driving voltage to be one of a plurality of detection angles;

receiving a plurality of feedback currents from the brushless DC motor, wherein the plurality of feedback currents correspond to the plurality of PWM signals, respectively;

performing comparison upon the plurality of feedback currents, to generate a comparison result; and detecting the initial rotor position of the brushless DC motor according to the comparison result;

wherein stopping outputting the PWM signal to the brushless DC motor according to the integrated voltage corresponding to the PWM signal comprises:

in response to the integrated voltage being not smaller than a predetermined value, stopping outputting the PWM signal to the brushless DC motor.

10. The method of claim 9, wherein the plurality of detection angles are 0 degrees, 60 degrees, 120 degrees, 180 degrees, 240 degrees, and 300 degrees.

11. The method of claim 9, wherein in response to the integrated voltage being not smaller than the predetermined value, stopping outputting the PWM signal to the brushless DC motor further comprises:

after the PWM signal is stopped to be output to the brushless DC motor, setting the integrated voltage as an initial value.

12. The method of claim 9, wherein receiving the plurality of feedback currents from the brushless DC motor comprises:

in response to the integrated voltage being not smaller than a predetermined value, receiving a feedback current corresponding to the PWM signal from the brushless DC motor.

13. The method of claim 9, wherein the comparison result is indicative of a maximum feedback current in the plurality of feedback currents.

14. The method of claim 13, wherein detecting the initial rotor position of the brushless DC motor according to the comparison result comprises:

detecting the initial rotor position of the brushless DC motor according to an angle corresponding to the maximum feedback current of the driving voltage.

15. The method of claim 9, wherein the input voltage is generated by processing an alternating current (AC) voltage signal.

16. The method of claim 9, wherein the input voltage is provided by a battery.

* * * * *